US00RE36346E

United States Patent [19]

Germain

[11] E Patent Number: Re. 36,346

[45] Reissued Date of Patent: Oct. 19, 1999

[54] INTERACTIVE GOLF GAME INFORMATION SYSTEM

[75] Inventor: Craig D. Germain, Hilton Head Island, S.C.

[73] Assignee: Golf Partner International, Cayman Islands

[21] Appl. No.: 08/515,233

[22] Filed: Aug. 15, 1995

Related U.S. Patent Documents

Reissue of:

[64] Patent No.: 5,319,548
Issued: Jun. 7, 1994
Appl. No.: 08/052,747
Filed: Apr. 27, 1993

[51] Int. Cl.[6] ..... G06F 15/44

[52] U.S. Cl. ..... 364/411.1; 364/410.1; 463/407

[58] Field of Search ..... 473/407; 364/410, 364/411, 411.1, 410.1; 463/407

[56] References Cited

U.S. PATENT DOCUMENTS 3,665,494 5/1972 Baumoel .
4,220,992 9/1980 Blood et al. .
4,666,156 5/1987 Wakisaka .
4,666,157 5/1987 Bodine et al. .
4,815,020 3/1989 Cormier .
4,910,677 3/1990 Remedio et al. .
5,013,070 5/1991 Maude, Sr. .
5,095,430 3/1992 Bonito et al. .
5,127,044 6/1992 Bonito et al. .
5,245,537 9/1993 Barber .

*Primary Examiner*—Michael O'Neill
*Attorney, Agent, or Firm*—Oliff & Berridge PLC

[57] ABSTRACT

An interactive golf game information system receives, stores, analyzes and outputs a plurality of different types of information related to golf. The system generates a golf play recording card for every hole on a golf course. The recording cards can be customized to display information on how previous rounds of golf on the same course were played or how the system recommends to play the course. A golfer uses these recording cards to record a single character for each stroke on each hole. Each single character represents one of a number of golf clubs used and a golf ball location on the actual golf course. After the golfer is finished playing, the cards are inserted into the system which reads the marks recorded on the golf play recording cards by recognizing each of the characters marked on each card. After the system reads and processes the information recorded on the cards, the system compiles statistical information and analyzes a golfer's performance based on information recorded read.

23 Claims, 11 Drawing Sheets

INTERACTIVE GOLF GAME INFORMATION SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an interactive system for receiving, storing, analyzing and outputting information related to the game of golf, and, more particularly, to an interactive golf information system that can read marks recorded on a golf play recording card and generate golf play statistics and analysis based on the marks that are read.

2. Relevant Background

The game of golf is fast becoming one of the most popular sports in the United States, as well as other countries. The game is usually played on a 9 or 18 hole golf course with a variety of golf clubs used to hit a golf ball different distances. Each hole of a golf course may include a tee off area having a number of different tee markers, a fairway, a rough, a putting green, and a pin located in a cup on the putting green. Each hole may also include various hazards such as sand traps, water hazards, bunkers, trees, etc. Each golfer records on a scorecard the number of times required to hit a golf ball from one of the tee markers into the cup on the putting green for each hole. After all of the holes of a course are completed, the golfer tallies the score for each hole and records a total score for the course. Thus, the information recorded on such a scorecard consists of a total number of stokes required for each hole and for the entire course.

The conventional scorecards are usually pocket-sized cards with a grid for keeping track of a number of different players' scores for each bole. Some scorecards also have information concerning rules, etiquette, tee-to-pin distance for each tee marker available, par for the hole, and a graphical map of the course depicting the layout of each hole including any obstacles and hazards in symbolic form. Although these scorecards provide a golfer with additional information, only the number of strokes required per hole is recorded on the scorecard.

Another type of scorecard is disclosed in U.S. Pat. No. 4,666,157 to Bodine et al. in which a player records on a scorecard, a number in a predetermined area of the scorecard, indicating which of a plurality of golf clubs is used for each stroke and a mark indicating a location of the golf ball on the golf course after each stroke. The scorecard includes a top view of a fairway and putting green including distances from various points on the course to a pin for each hole to allow a golfer to record the location of the golf ball. The data recorded on the scorecard provides information for a computer system to provide statistical information on a hole-by-hole basis or club-by-club basis for flight, distance, swing and positioning information. Golfers use this statistical information to evaluate their play.

SUMMARY OF THE INVENTION

It is an object of the invention to provide an interactive golf information system which receives, stores, analyzes and outputs a plurality of different types of information related to golf.

It is another object of the invention to provide an interactive golf information system for compiling and analyzing golf play based on information recorded on a golf play recording card.

It is a further object of the invention to provide an interactive golf information system capable of reading golf game information recorded on a plurality of golf play recording cards.

It is also an object of the invention to provide an interactive golf play recording card generator for generating a pocket-sized golf play recording card for each hole of a golf course.

It is another object of the invention to provide an updating device for updating golf course and weather conditions, rules of play, tee-to-pin distances, instructions on how to best play a hole and any other important information prior to generating the golf play recording cards.

It is also an object of the invention to provide a an interactive golf information system including a golf play recording card customizing device for customizing the recording cards based on a golfer's preference as to what additional information he would like displayed on the cards.

It is an additional object of the invention to provide an interactive golf information system including an analyzing device for providing detailed analysis and statistical information based on information read from the information recorded on the golf play recording cards.

These and other objects, features and advantages will become apparent to those skilled in the art from the following detailed description when read in conjunction with the accompanying drawings and appended claims.

In accordance with a broad aspect of the invention, a golf information system comprises a central processing unit having a user interface which allows the system to be accessed directly, for example, by a golfer in a golf course club house or indirectly, such as, a golfer using a remote access device. The user interface preferably includes a display device and an input device. The display device displays a user selection menu which provides a golfer with a variety of options to select a variety of system operating modes. If a golfer is not ready to play, the golfer can select one of the options for paying a transaction cost, reserving a tee time, generating a printed lesson based on previous rounds of golf played, printing or displaying a previously played round of golf, statistical analysis and information on a previous round or rounds of golf, league information, handicap, course conditions, information on other golfers and information on other golf courses. If a golfer is set to tee off soon, the golfer can select one of the options to pay for the round of golf and use of the golf information system, select how to customize the golf play recording cards and generate the customized golf play recording cards.

A single pocket-sized golf play recording card is provided for each hole. Each of the golf play recording cards may have the following information printed thereon: a layout of the fairway and green with distance indicating marks which indicate distance from a pin to various points on the course and distance from each of the tees to the various hazards on the course, cup location, topographical information showing the terrain of the hole, weather conditions, hazards, areas under repair, fairway conditions, putting green conditions, instructions on how to best play the hole, advertisements, and rules of play for the day. All of the previously described information can be updated daily and even just before the cards are printed. The cards also contain other information such as par for the hole, name of golfer playing, a grid for recording stroke information, an arrow showing true north, separate display areas for the putting green and fairway, a golfer's handicap, services available on a particular hole, and instructions on how to use the system. Further, each card has a bar code printed thereon to identify a golfer recording the marks on the card and a particular hole that specific card represents. Each card can be customized by adding information such as marks indicating how a previous player played the hole, what clubs the previous player used to play the hole and any other appropriate information such as a different scoring system (Calcutta, Skins, Straight Golf, etc.) being used and bets made between golfers.

Using one of the golf play recording cards for each hole, a golfer records each stroke on each hole by entering a single mark for each stroke. The single mark is in the form of an alphanumeric character which indicates a golf club used for that particular stroke and the location of the golf ball after that particular stroke. The single mark is recorded at the exact point on the golf play recording card that corresponds to the exact location of a golf ball on the actual golf course after each stroke. Other information concerning the conditions of the course, difficulties encountered, and weather conditions can be recorded as well with additional marks in another part of the card.

After each stroke for each hole is recorded on the golf play recording cards, the cards are inserted in any order into a reader and information marked on the cards is read and stored in the system. The cards can be inserted in any order and mixed with other golfer's cards because the system recognizes the hole and golfer from the bar code on each card. It should be pointed out that the reader can read both the golf club used and the exact location of the golf ball for each stroke, as well as any other information recorded thereon. Further, the system can read the type of scoring being used by a golfer from a mark on the card and analyze a player's performance according to the chosen scoring system. Also, the system can tally the results of the bets made and inform each member of a golfing party how much each player won or lost.

Once the information on the round of golf just played is input to the system, a golfer can select any of a variety of menu options displayed on the display. The golfer can choose to keep his information input into the system private through a selected menu option, a special access code or I.D. card. A golfer can also select an analysis mode where his last round of golf is analyzed for proper club selection, consistent errors, strokes per hole, strokes per club, distance per club, number of putts, fairways and greens hit in regulation, penalties, saves, eagles, birdies, pars, bogeys and USGA handicap with slope rating of the course played. Further, a golfer can select a command to have the system output a lesson for improving consistent golfing errors detected by the computer or a suggested golf club selection list depicting each club a golfer used and a club recommended by the system for improved play. The golfer can also select any of the previously described options including reserving a tee time for the next round of golf and printing or displaying a previously played round of golf with or without the scores of the other members of the golfer's party, statistical information on a previous round or rounds of golf, league information, handicap, course conditions, and information on other golfers.

If a golfer does not wish to go through the above selection process, the golfer can simply record a default selection list in the system so that whenever that particular golfer inserts golf play recording cards, the system knows what options that golfer desires. For example, a golfer may record in the system that he wants all of the available statistical analysis to be conducted and he wants the same tee time to be reserved. The system will conduct the analysis and reserve the appropriate tee time without the golfer having to make the selections each time. This feature allows a golfer to drop his golf play recording cards into the system after a round of golf and avoid having to wait around to go through the options selection process. The golfer can access the analysis and information later, at home or whenever he returns to the golf course.

BRIEF DESCRIPTION OF THE DRAWINGS

The invention is illustrated in the accompanying drawings, in which:.

DETAILED DESCRIPTION OF PREFERRED EMBODIMENTS

Figure 1:
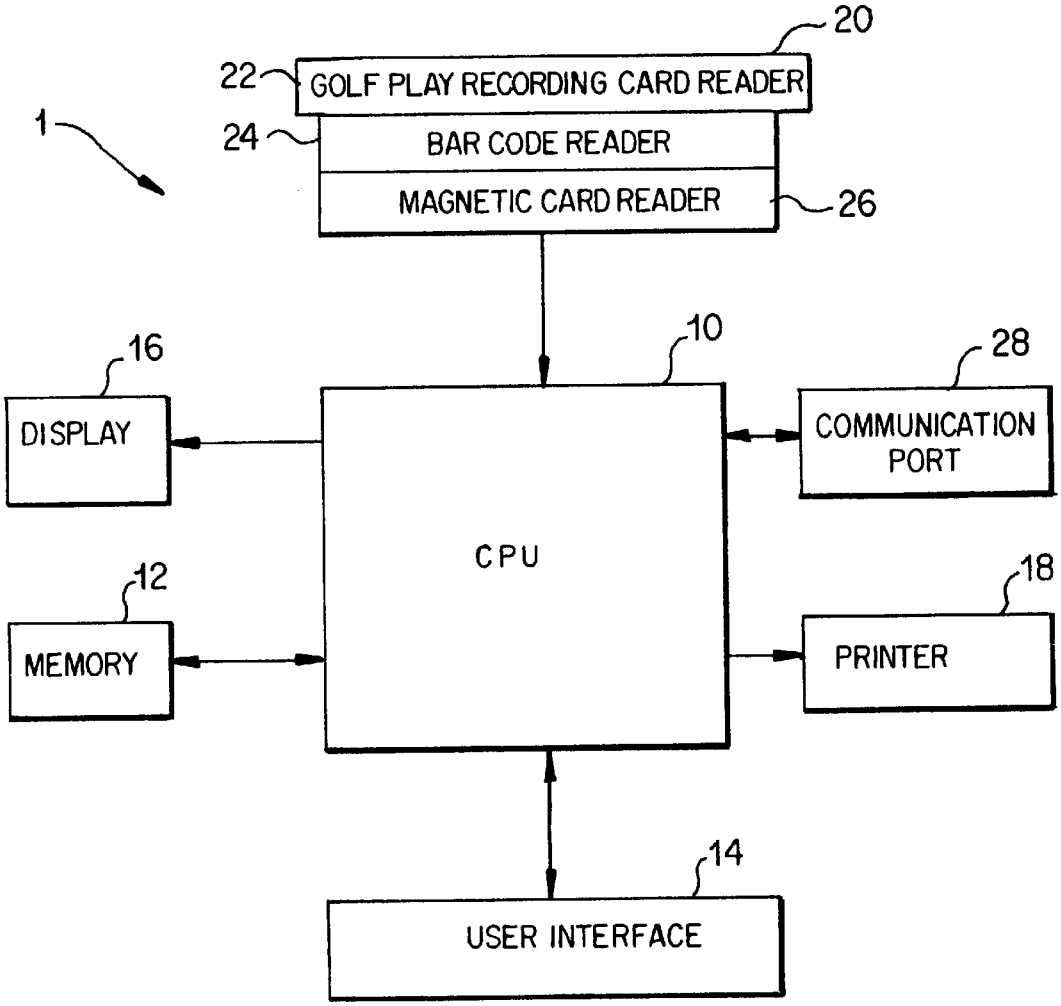
FIG. 1 is a block diagram of the interactive golf game information system of the present invention.

FIG. 1 shows the elements of an interactive golf game information system 1 of the present invention including a computer having a central processing unit (CPU) 10 which controls the system operation and processes information input to and output from system 1. CPU 10 is connected to a memory 12 which stores all of the programs required to operate the system and all of the data input to the system. Memory 12 can comprise a mass memory such as a mainframe device at a remote location or a hard drive at the golf course pro shop for storing golf information for a large number of golfers, i.e., essentially for every golfer in the world. Memory 12 can also comprise a read only memory (ROM) for storing all of the operating programs which control the functions of the system. Alternatively, the system operating programs can be stored in the computer in the form of a programmable read only memory (PROM) if the computer is to be used only for the golf game information system. Memory 12 can also comprise random access memory (RAM) for storing data which changes often such as weather conditions, course conditions, golfers playing data, tee-to-pin distances, etc.

Figure 2:
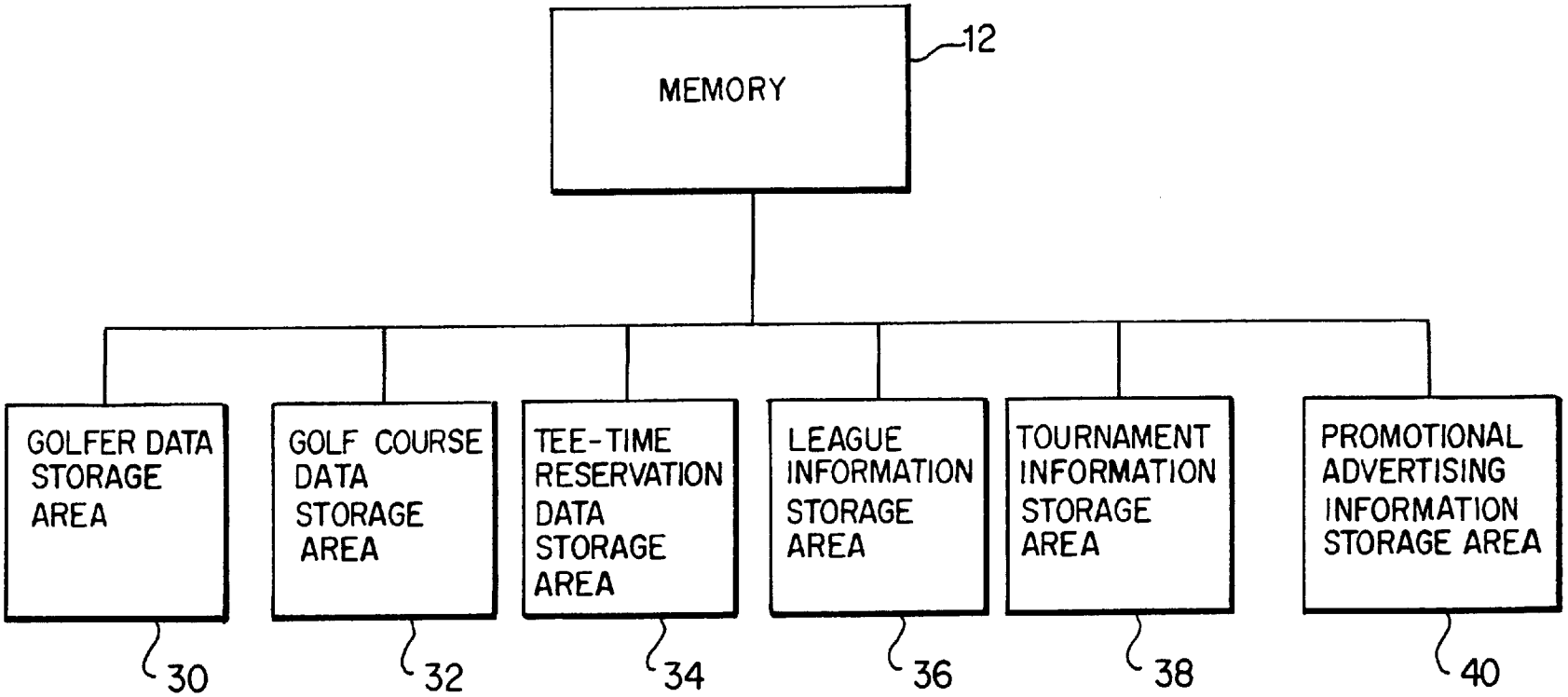
FIG. 2 is a schematic view of the data storage areas of the memory of FIG. 1.

As seen in FIG. 2, memory 12 includes a plurality of storage areas including a golfer data storage area 30, a golf course data storage area 32, a tee-time reservation data storage area 34, a league data storage area 36, a tournament data storage area 38, and a promotional ad data storage area 40. Golfer data storage area 30 can include a separate storage area for each golfer using the system. A variety of information can be stored for each golfer in golfer data storage area 30 including name, address, telephone number, social security number, handicap, golf club memberships, default options previously selected by the golfer, tee-time reservation information, statistical data on previous rounds of golf played, financial account information, tournament and league memberships and associated rounds of golf played and any other pertinent information. When a golfer uses the system, the system can easily access all of the information stored in that golfer's separate storage file.

Tee-time reservation data storage area 34 includes information on tee-time reservations for every golf course using the system. Thus, tee-time storage area 34 can be a central database for storing tee-time reservations for courses all over the United States and world. The information stored for each tee-time reservation on each course includes a date, a time, number of people in a golfing party, names of the golfing party members, any special requests or needs of the golfing party such as a need for left handed clubs or a lesson from a golf course professional prior to teeing off, a phone number where at least one member of the golfing party can be reached and other appropriate information.

League data storage area 36 and a tournament data storage area 38 are used for league play and tournament play to record the participating golfers, immediately updating and displaying each golfer's score as play progresses, rules of play, entry or membership rules and requirements including fees, scoring information, leader board information and other pertinent information. Further, league data storage area 36 can be used to conduct nationwide tournaments between several different golf courses simultaneously.

Promotional advertising data storage area 40 stores information concerning advertising printed on the golf play recording cards and other material printed by the system. For example, a golf play recording card, a tee-time reservation card or a layout of the course including how a golfer just played the course can have advertising information printed thereon. Information concerning advertising available, cost of each advertisement, location of each advertisement on each item output by the system, content of advertisements, etc. is stored in promotional ad data storage area 40. All of this information can be easily updated by a prospective advertiser or a system manager.

Additional information storage areas within memory 12 can be easily set up and maintained for any number of other categories of information to be used by the system.

CPU 10 is also connected to a user interface 14 which allows a user to interact with the system. User interface 14 preferably comprises a touchscreen, a voice print recognition device, or a keyboard but can also comprise any other information inputting device. By inputting certain data, golfers can select a particular operating mode of the system. Further, golfers can use the user interface 14 to enter information to be input into one of the plurality of data storage areas in memory 12.

CPU 10 is further connected to a display 16 which provides a golfer with information and data concerning the operation of the system and the information being input and output to the system. Display 16 may preferably be a color monitor including a cathode ray tube or an LCD. Alternatively, as mentioned above, a touch sensitive display screen can be provided in place of display 16 and user interface 14 and perform the same functions thereof. Display 16 can also be used with a voice print recognition device previously discussed.

CPU 10 is also connected to printer 18 for printing any of the data and information input to and output by the system. Printer 18 is preferably a multi-color printer, color laser copier or the like and is capable of printing data supplied by the system. Printer 18 also includes a supply of various printing media for printing a variety of information in several different formats, for example: color golf play recording cards, tee-time reservation receipts, certificates for outstanding play, transaction receipts, account statements, a layout of a golf course including marks depicting how a round of golf was played, tournament results, league standings and other information for which a golfer wishes to receive a permanent record.

CPU 10 is additionally connected to a data reader 20 which can preferably include at least a golf play recording card reader 22 and a bar code reader 24. Golf play recording card reader 22 can preferably be an image scanner, an image digitizing and rasterizing device and optical character recognition device (OCR) which is capable of recognizing alpha-numeric characters from the image of the golf play recording cards scanned by the scanner or rasterizing. Once the images are scanned by the scanner, the digitizing or rasterizing device digitizes or rasterizes the scanned image. Then, the OCR recognizes the marks made on the golf play recording cards from the digitized image and stores the location and type of character of each mark. Bar code reader 24 is used to read bar code information on the golf play recording cards including a golfer's name and personal information, a hole represented on each card and any other information contained in the bar code. Data reader 20 may also comprise a magnetic card reader 24 preferably comprising a magnetic character recognition system capable of reading and writing magnetic data on a magnetic recording medium such as an identification card, a credit card or an automatic teller machine bank card. The identification cards used with magnetic card reader 26 are used to allow a golfer to access the system to update or retrieve information, change the golfer's default option selection, to keep his scores and golf play information private or to allow a golfer to select any of the other system functions. The identification cards can also be used as debit cards allowing a golfer to pay for greens fees, use of the golf information system, food from the clubhouse, items in the pro shop, and for various services such as lessons, caddies, etc. If a golfer does not wish to use the identification card as a debit card, payment for the above items can be made using a credit card or an automatic teller machine bank card. To make a transaction using a credit card or a bank card only requires the same activities as in a standard automatic teller machine transaction.

CPU 10 is also connected to a communication port 28 to allow a golfer to access the system via a remote access device such as a modem, telephone or computer located at a remote location. Communication port 28 can be used to verify credit cards, access codes, bank card authorization data and any other identification data and to allow a system user working from a personal computer to access the system. This would allow a golfer to access the system and have the system perform any one of the variety of functions while the golfer is at home or away from a main computer located preferably in a golf course club house or sports equipment store. For example, a golfer can use a phone or home computer to reserve a tee-time, generate a corrective lesson based on previous performance, review play of a round, retrieve statistics, analysis of previous rounds played and any other information stored in the system.

Figure 3:
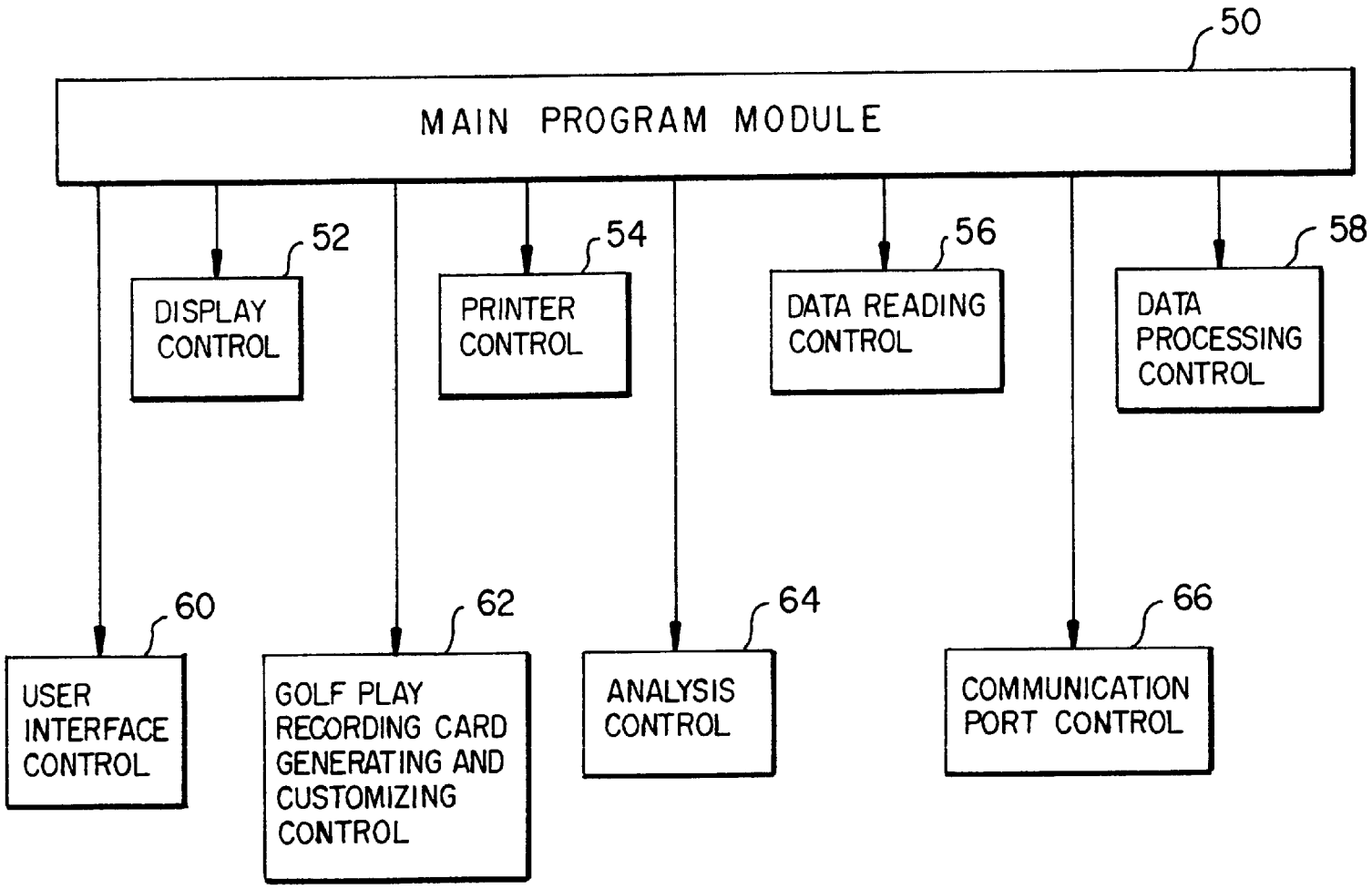
FIG. 3 is a block diagram of the control program for the golf game information system of the present invention.

FIG. 3 is a functional block diagram of the system operating program stored in memory 12. In accordance with known principles, a control program consists of a plurality of program modules that each serve a specific identifiable function. A main program module 50 maintains overall control of the system operation and calls into operation any of a number of subordinate programs whenever needed. The subordinate programs include: a display control module 52 for controlling what and how information is displayed in display 16, a printer control module 54 for controlling the information and format of material printed by printer 18, a data reading control module 56 for reading data from any of the golf play recording cards and bar codes printed thereon, credit cards, golfer identification cards, automatic teller machine bank cards, etc., a data processing control module 58 for controlling how the information read by data reader 20 is stored and analyzed, a user interface control module 60 for controlling the flow of data from user interface 14 to the system, a golf play recording card customizing and generating control module 62 for controlling how a golf play recording card is customized and what information is printed on each recording card, an analysis control module 64 for controlling the nature and extent of analysis requested and a communications port control module 66 for controlling access of the system from any of a number of remote access devices. As can easily be understood, any additional subordinate programs can be added to accomplish any additional desired functions. It should be understood that the control program may be organized in other ways according to preferences of the designer of the program and details of the tasks to be performed.

Figure 4:
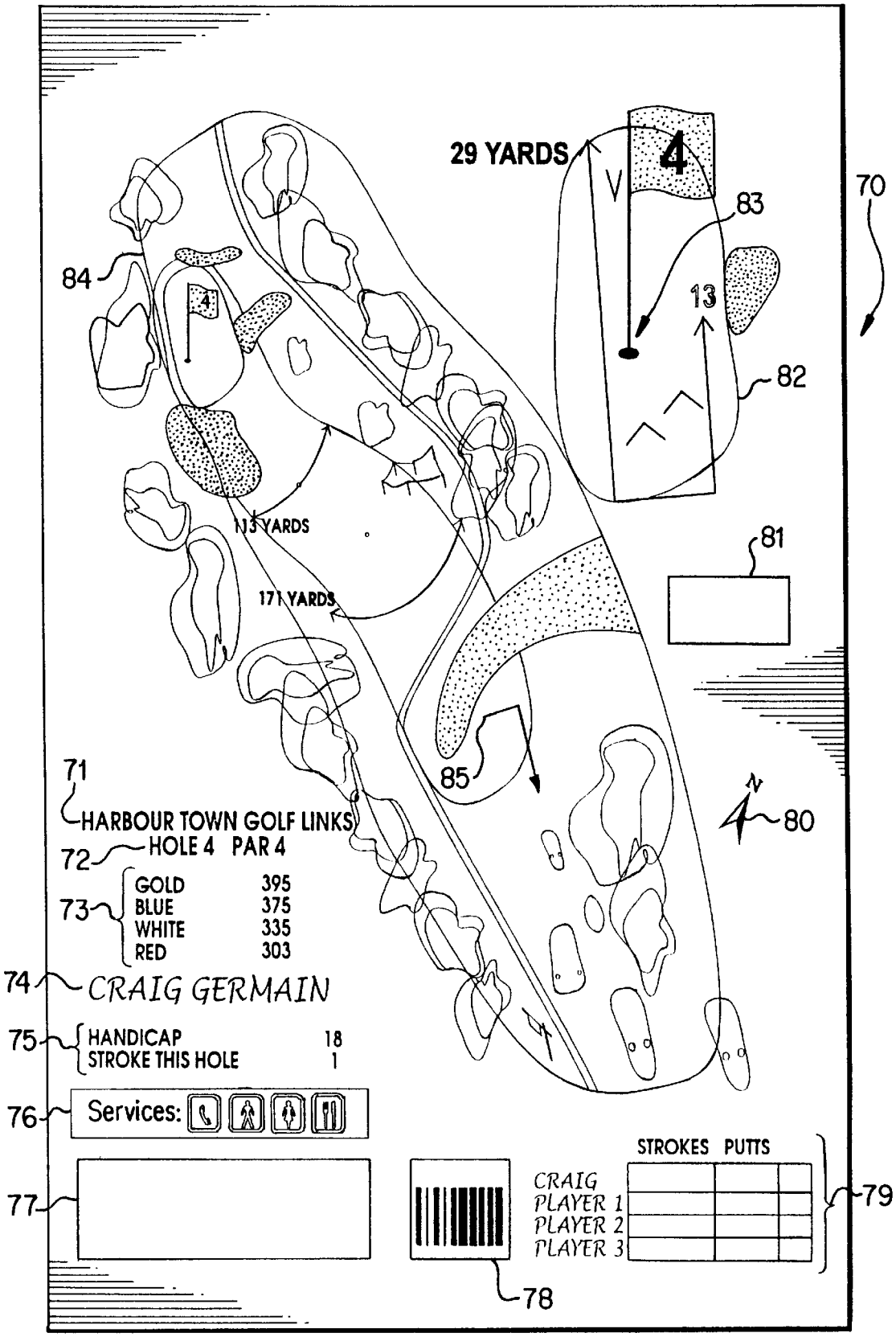
FIG. 4 is a pictorial view of one side of a golf play recording card used in the present invention.

FIG. 4 shows a first or front side of a pocket-sized golf play recording card 70 for a particular hole on a golf course. All of the information printed on each of the recording cards 70 for each of a plurality of golf courses is stored in memory 12. The information can be updated as often as desired, preferably by golf course management having an appropriate access code to change the golf course information. The information that can be displayed on each card 70 for each hole includes but is not limited to: the name of the golf course 71, the hole number and par for that hole 72, the tee-to-pin distance for each of the tee markers 73, the name of a golfer 74, a handicap for the golfer and number of stokes to be given on that hole 75, services available on that hole 76, instructions on how best to play that hole 77, a bar code identifying the particular hole and the golfer 78, a scoring grid 79 for keeping track of strokes and putts of each of the members of a golfing party, an arrow 80 showing true north used to gauge wind direction, weather conditions 81 updated just before play begins, an exploded view 82 of the putting green including topographical slope information, distance information and hole location 83, and an overall layout view of the entire hole 84 including each of the tee markers, fairway, rough, obstructions, areas under repair, pin location, distance information, topographical information, tee-to-hazard distance 85 and any other pertinent information.

Figure 5:
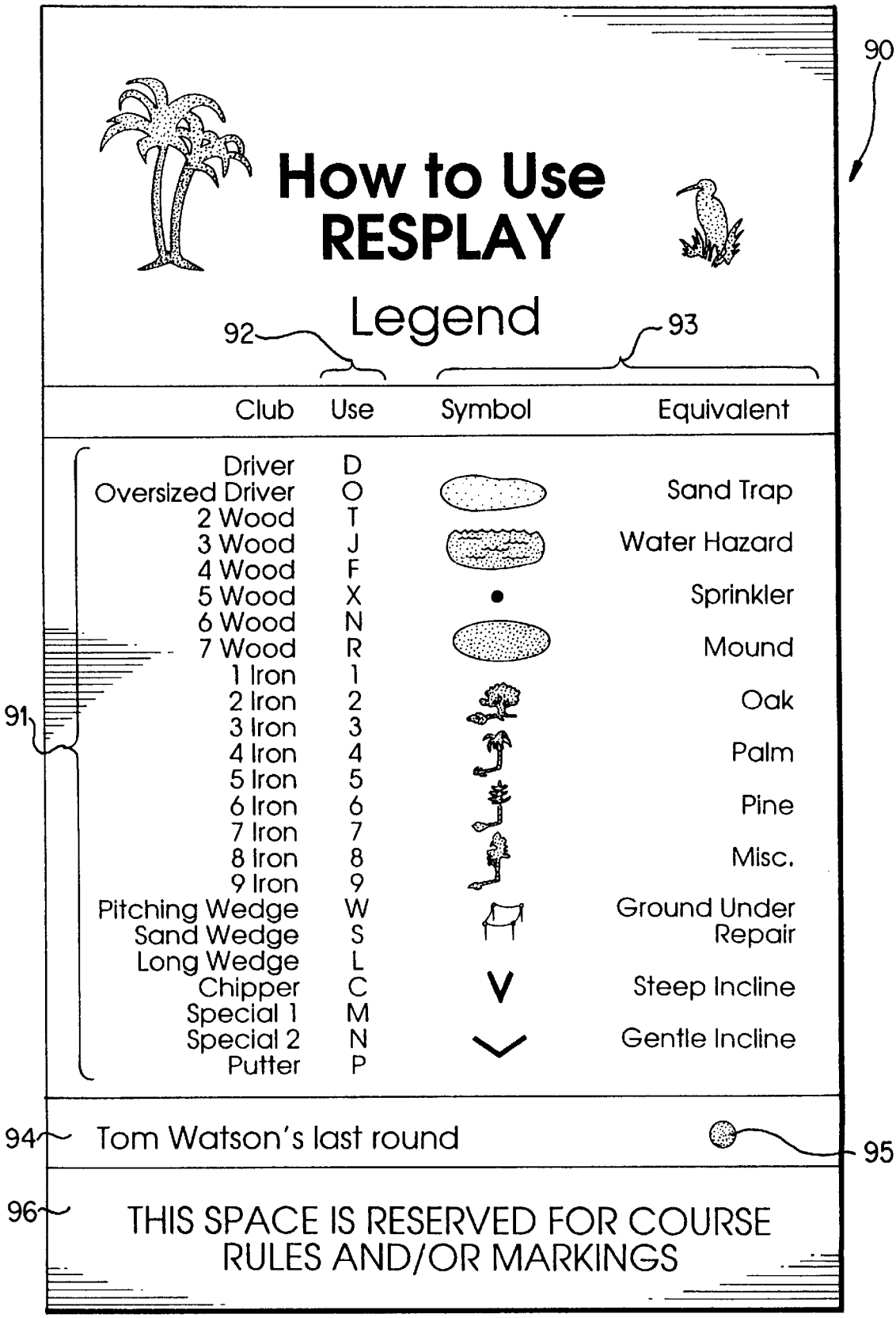
FIG. 5 is a pictorial view of an instruction card used with the golf play recording cards of the present invention.

FIG. 5 is an instruction card 90 instructing a golfer how to use the golf play recording cards 70 of FIG. 4. The card 90 in FIG. 5 can be printed on a reverse side of the card 70 shown in FIG. 4. Alternatively, the instruction card shown in FIG. 5 can be a single card printed separately from the golf play recording cards. Thus, by printing only one instruction card 90, it is not as expensive or time-consuming to print the golf play recording cards of FIG. 4. The information displayed on card 90 includes a listing of golf clubs 91 that a golfer has in his golf bag. This list can be modified by a golfer simply adding a golf club not shown on the card. Also displayed on instruction card 90, are the specific characters 92 used to represent each of the golf clubs in a golfer's bag. These characters 92 are normally preprinted on the card according to a list input by a golfer when he first joins the system. That is, when a golfer sets up an account on the system, the system will output a card 90 with no golf club information recorded thereon. The golfer then writes on card 90 each club in his bag and the characters 92 he will use to indicate each club. The golfers inserts completed card 90 back into the system which reads and stores characters 92 written in that golfer's own handwriting. Thus, the system can recognize a golfer's handwriting and reduce card reading errors.

Another group of symbols 93 is used to represent elements shown graphically on the layouts 84 of each hole contained on card 70. These elements 93 are indicative of the course conditions and can be updated by the golf course management having access to the appropriate security code to update the golf course information stored in the golf course data storage area 30 of memory 12.

A customizing information area 94 is provided to inform the golfer how each card is customized and how customized information is displayed on card 70 shown in FIG. 4. In this example, the golfer selected to have the last round of a professional golfer, such as Tom Watson, printed out on the first side of the golf play recording card 70. The way Tom Watson played this particular hole is then identified on the first side of the card 70 using the symbols 92. The present golfer can then compare how his play matched up with the play of any professional golfer such as Tom Watson or any other golfer including a golfer's own play. Any number of additional rounds of golf for any player having playing data stored in memory 12 can also be displayed. The information on Tom Watson's last round is displayed using a single distinguishing character 95 for each stroke indicating a club used by Tom Watson and a location of a golf ball after each stroke. The distinguishing characters 95 can be displayed in a different color or different script from characters 92 and other marks contained thereon to allow a golfer to distinguish Tom Watson's information from marks indicating current play information or other player's previous playing information. Thus, a golfer can use the golf information recording card to view how several professionals and other golfers played each hole as the golfer is playing each hole.

Alternatively, a golfer may only be concerned with his own previous play and choose to have his average, personal best or any other of his previous rounds printed on each of the golf play recording cards to help him better judge club selection and determine how to improve his own play. If more than one previous round of golf is displayed on card 70 shown in FIG. 4, there will be a different distinguishing mark 95 and identifying information 94 for each of the rounds displayed.

A course rules information area 96 is provided to indicate the rules of play as rules often change from time to time for such reasons as limiting carts on the fairway, controlling speed of play and providing other notices to the golfer. This information is updated just prior to the printing of the cards and prior to commencement of play. Further, special instructions for a particular hole can be printed on the card 90 for that particular hole. Other information displayed on the card 90 may include instructions on how to use the system and cards, advertising, club house menu selections, or any other pertinent information. Another information area can be provided on this card 90 to record golfer's observations of the conditions of the course and weather conditions. The golf course management can then review consistent information concerning the golf course and weather conditions and update the golf course and weather information to be printed on subsequent golf play recording cards.

It should be noted that the overall layout 84 and the putting green layout 82 are accurate representations of each hole and may possibly be drawn to scale. However, each hole may not have the same scale as some holes are longer than others. As the layouts are accurate representations of each hole, when a golfer records a golf ball location on the card 70, an accurate representation of the golf ball location and the distance the golf ball travelled from the last golf ball location is easily determined by the system.

The golf play recording card of FIGS. 4 and 5 is used as follows. A golfer marks one of the plurality of tees G, B, W, R corresponding to tee markers 73 from which he is teeing off. After a first shot, the golfer marks the exact location of the ball on the actual course by entering a single character at the exact location on the card 70 corresponding to the golf ball location on the course. The mark used by the golfer is a single character mark corresponding to one of the plurality of symbols 92 representing one of the plurality of clubs 91 contained in the golfer's bag. The golfer can record a mark on either the overall layout 84 or the putting green layout 82.

It is important to note that a single character is used to mark each stroke. A single character not only indicates a particular golf club used for each stroke, the character also indicates a golf ball location from which a distance that the golf ball travelled from the last golf ball location can easily be determined by the system. In some instances, it may be necessary to know the sequence of shots to determine the distance that the golf ball travelled from the last golf ball location. For example, if two putts are necessary to sink the ball, the first putt will be denoted with the mark "P" and the second putt with the mark "P". A third putt will be denoted by the mark ["P"] "*P*". The "P" represents the club and ball location, and the underline represents the shot sequence so the system can determine the distance of each putt. The same scheme is used for any club whenever the same club is used more than once on a hole. The underlined character on the layout is the mark representing the club and ball location. Once all of the marks are recorded for each stroke on each hole of the golf course, the cards are inserted into the golf play recording card reader 22 which reads each of the marks made on each of the cards. The golf play recording cards can be inserted into the reader 22 in any order and can be mixed with another golfer's cards as the bar code 48 on each of the cards identifies a player and a particular hole. Golf play recording card reader 22 also reads bar code 78 to ensure that the information read therefrom, is stored in the correct area in the golfer data storage area 32 for a particular golfer.

Once all of the information from each of the cards is read by the reader 22 and stored in memory 12, a golfer can select what statistical information and analysis he desires. Also, a golfer can select to keep any of the golf information and statistical data private by entering a special access code or selecting a menu option. As mentioned previously, a golfer can set up a default options selection list which allows him to drop the cards in reader 22 and then leave the golf course without having to wait to make all the different menu options selections. Thus, all of that golfer's selected functions are performed by the system and stored so that the information can be accessed later by the golfer. Alternatively, a golfer can take his marked golf play recording cards with him when he leaves the golf course and drop them in a remote card reader such as a card reader at a golf or sports equipment store or some other location having a golf play recording card reader.

In the analysis control program module 64, the system uses the data read from the cards to determine a variety of statistical information such as strokes per hole, strokes per club, distance per club, number of putts, greens hit in regulation, penalties, saves, eagles, birdies, pars, bogeys, USGA handicap slope rating of the course, and any other pertinent statistical information. Further, the golfer can choose to have his golf club selection analyzed and a list of recommended club selection output adjacent a list of actual clubs used to determine optimum golf club selection. Also, the golfer can select to have the system determine consistent playing errors and generate a lesson for correcting such areas. The system manager may also request that the system select any golfer's errors and then generate a letter to the golfer promoting or describing the types of lessons and equipment available at the golf course or pro-shop to correct the error. The lessons are compiled from various golf professionals and are stored in memory 12. The statistical information, club selection list, and error correcting lesson can be displayed in display 16 or printed by printer 18. Furthermore, a golfer can select to have any round of golf printed on a layout of the golf course by printer 18 including the rounds of each of the members of a golf party displayed in different colors. Furthermore, printer 18 can print various certificates to congratulate golfers on personal bests, saves, eagles, birdies, and any other meritorious play.

Figure 6:
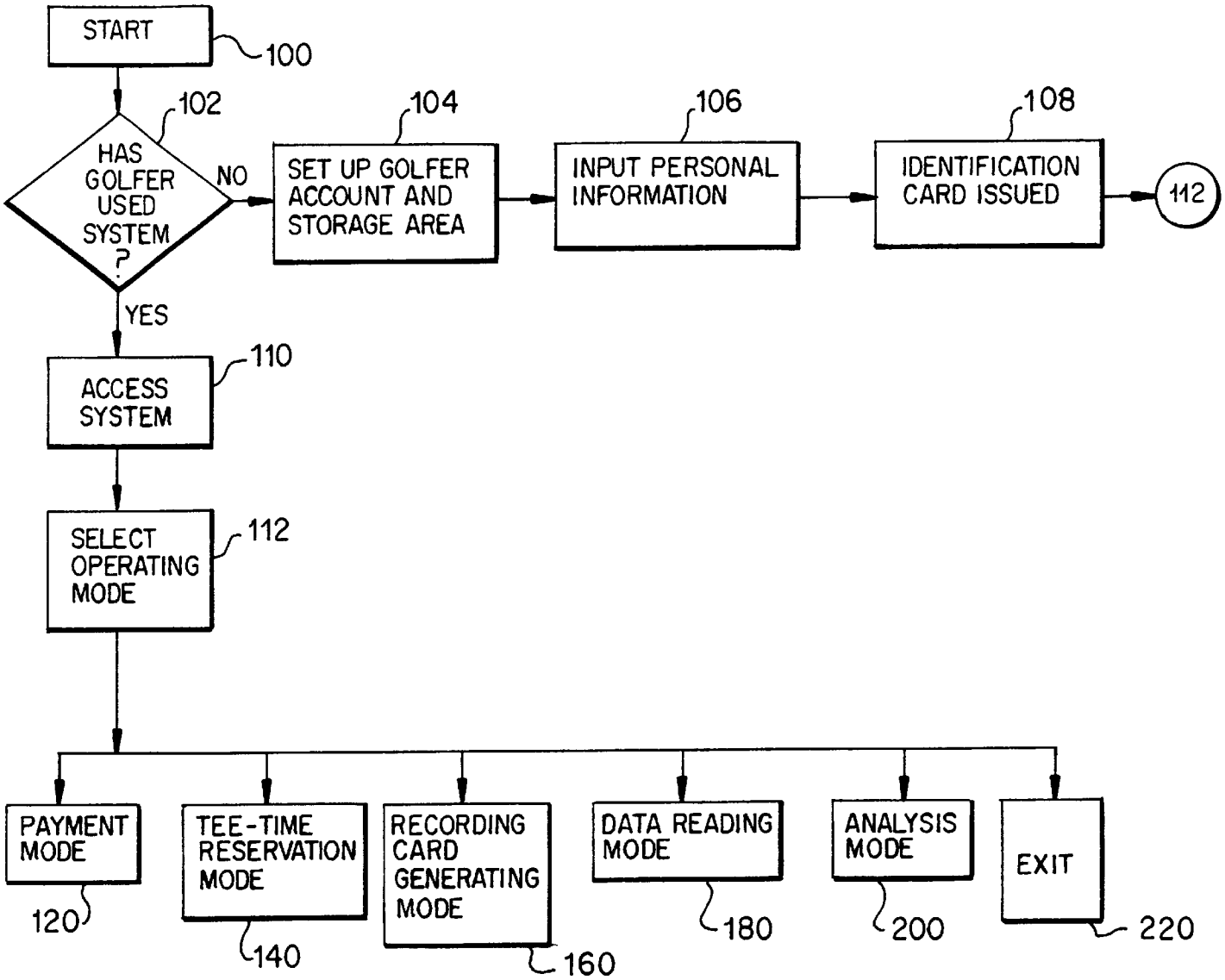
FIG. 6 is a flowchart diagram depicting the operation of the golf game information system of the present invention.

The flow chart of FIG. 6 depicts the operation of the interactive golf game information system of the present invention. The program begins at step 100. The system will inquire whether a golfer has used the system before at step 102. If a golfer has not used the system before, account information and a data storage area must be set up for the golfer, step 104. The system will prompt the golfer to input personal information including name, address, social security number, telephone number, statistical analysis to be performed for each round of golf played, keeping scores private or public, tee-time reservation instructions, and any other pertinent information, step 106. The system also prompts the golfer to input a personal identification number to be used in case the golfer does not have his identification card. The system automatically sets up a storage information area for storing the personal, golf and account information for the golfer. The system will also issue the golfer an identification card for automatic access to the system, step 108. The system will charge the new golfer's account for any set up costs and user's fees incurred in setting up the account. The golfer will have an opportunity to pay this amount and even add money to his identification/debit card if he so desires in the payment mode to be described later.

If the golfer has used the system before, the golfer only has to insert his identification card or enter his personal identification number to access the system, step 110. If a golfer does not have his identification card and cannot remember his personal identification number, the system will prompt the golfer for a password such as mother's maiden name or other personal information until the system is satisfied that a fraudulent entry into the system is not occurring. Next, a golfer enters the selection operation mode, step 112. The various modes a golfer can select include a payment mode 120, a tee-time reservation mode 140, a golf play recording card generating mode 160, a data reading mode 180, an analysis mode 200 and an exit routine 220. The flow then returns to the system operating mode selection, step 112.

Figure 7:
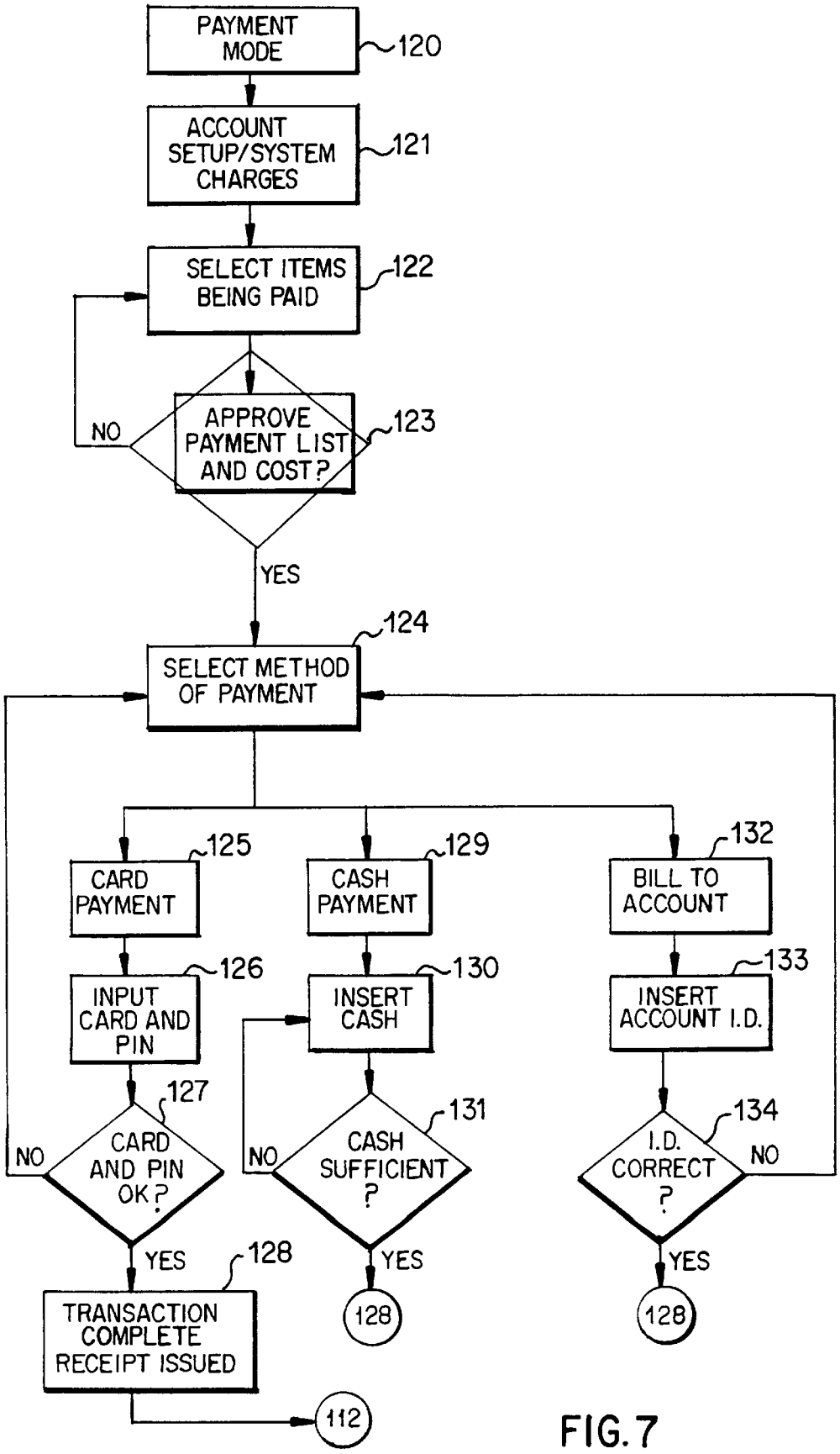
FIG. 7 is a flowchart diagram illustrating a payment operating mode of the golf game information system of the present invention.

In payment mode 120 shown in FIG. 7, the system will first inform a new golfer of the charges for setting up the account and use of the system, if applicable, step 121. Next, the system will request that a golfer indicate for which items payment is being made, step 122. These items can include greens fees, system fees, club house meals, pro shop items and services such as caddies and lessons. Once the golfer has indicated all of the items being paid for, the system will display each of the items and the corresponding costs along with a total cost. The system will inquire if the golfer approves the list and total cost, step 123. If the list is incorrect, the system will return to step 122 and allow the golfer to correct the list. If the list and total are correct, the system then prompts the golfer to select a method of payment, step 124. The golfer can select from a number of different payment methods including credit card, debit card, automatic bank teller machine card, cash, or bill it to a personal account If a golfer wishes to pay by credit card, debit card or automatic bank teller card, step 125, the system prompts the golfer to insert the card and enter a personal identification number authorizing the transaction, step 126. If the personal identification number is incorrect, step 127, the system will return to the method of payment selection, step 124, to allow the golfer to select an alternative method of payment. If the pin number is correct, the transaction is completed and a receipt is printed, step 128.

If a person selects cash, step 129, the system will prompt a golfer to insert the required amount of cash into a conventional cash receiving device, 130. The system will check for sufficiency of funds, step 131. If the golfer inserts insufficient funds, the system will return to the insert cash step and prompt the user for more cash. If sufficient cash is inserted, the transaction is completed, change is returned, and a receipt is printed, step 128.

If the user selects to bill the charges to a personal account, step 132, the system prompts the user to input an account identification in the form of either a personal identification number or a password, step 133. The system checks to ensure that the account identification information is correct, step 134. If the password identification number is incorrect, the system will return to the method of payment selection, step 124, to allow a golfer to select an alternate method of payment. If the account identification is correct, the transaction is completed and an account statement is printed, step 128. The flow then returns to the system operating mode selection, step 112.

Figure 8:
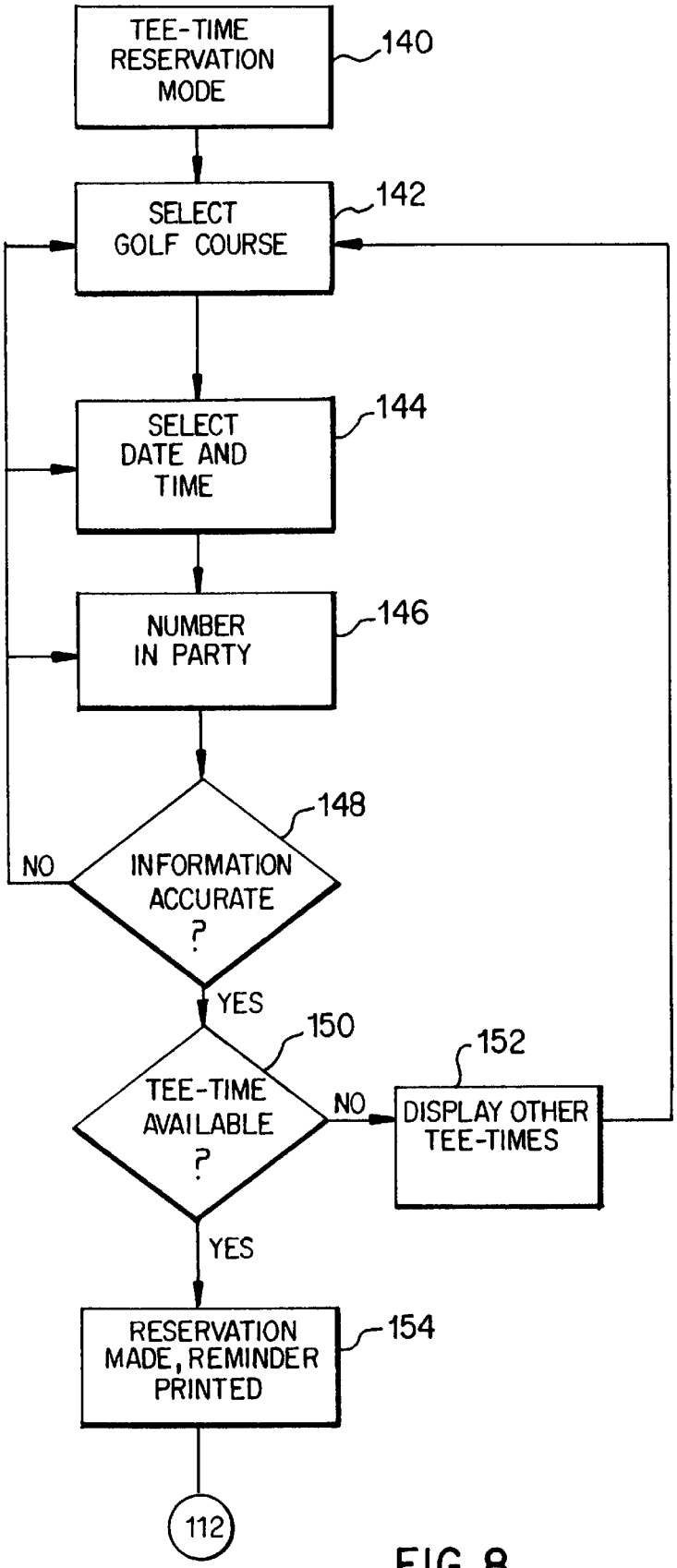
FIG. 8 is a flowchart diagram illustrating a tee-time reservation operating mode of the golf game information system of the present invention.

FIG. 8 depicts the tee-time reservation mode starting with step 140. The system will ask a golfer to select a desired golf course, step 142. This selection can be done by either entering the name of the course via user interface 14 or the system can display a list of area golf courses included in the system from which a golfer can choose. Once a course is selected, the system will prompt the golfer to select a date and time, step 144. The date and time can be entered in a similar manner to the golf course selection. Next, the system will prompt the golfer to input the number in the golfer's party, step 146. Once all of the pertinent information has been entered by a golfer, the system will prompt a golfer to certify that the information the system has for the tee-time reservation request is accurate, step 148. If any of the information is inaccurate, the golfer can select a particular item of information that is incorrect and the system will return to that selection step. If the information is correct, the system communicates with memory 12 to determine if the desired tee time is available, step 150. If the tee time is not available, the system will display a variety of other times available for that particular course and a variety of other courses available for that particular time and return to the select course step 152. The golfer can select anyone of the tee times listed in display 16 or just activate a quit key to exit the tee time reservation mode. If the desired tee time is available, the tee time reservation will be made and stored in memory 12 and printer 18 will print a reservation confirmation, step 154. The flow then returns to the system operating mode selection, step 112.

Figure 9:
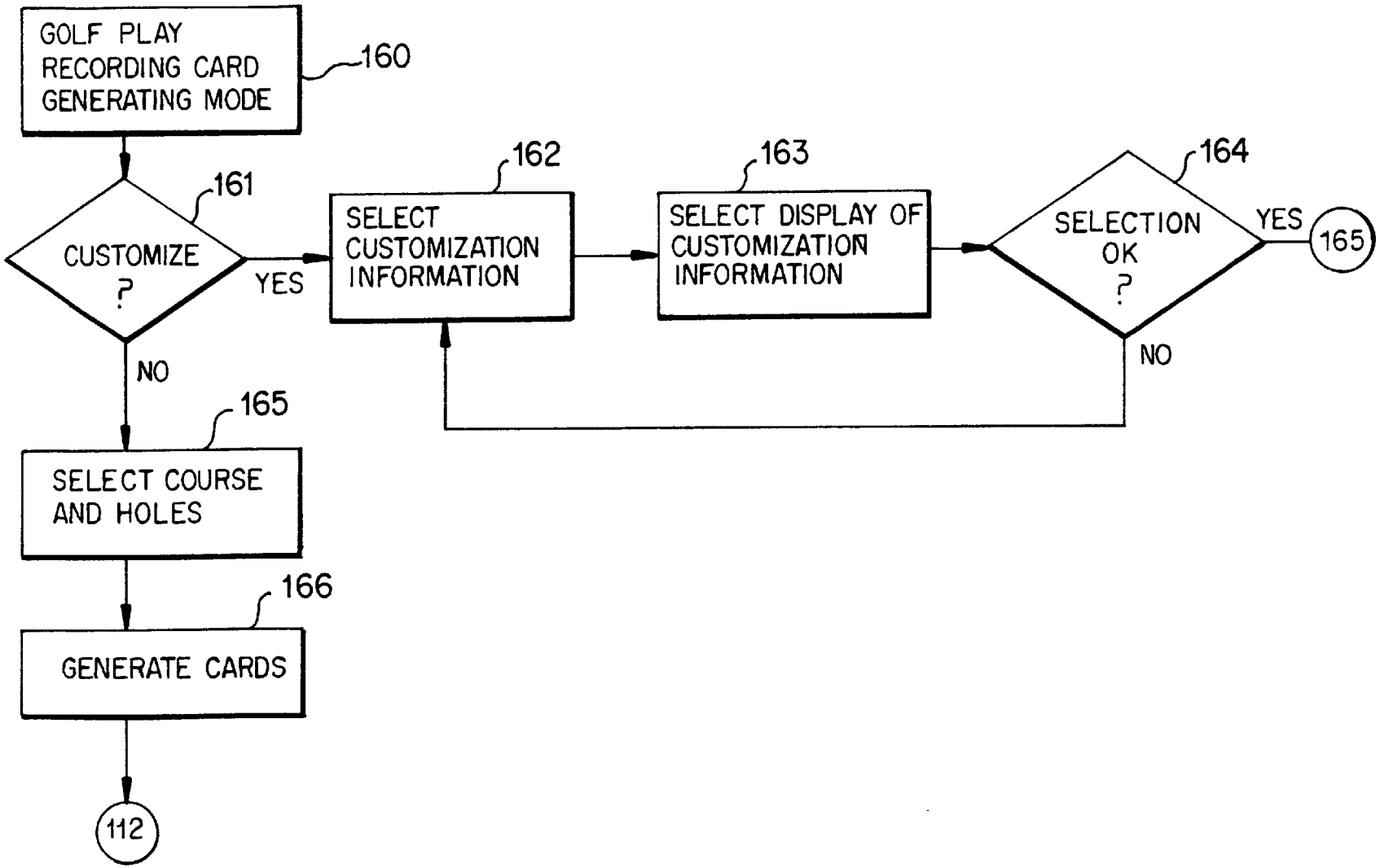
FIG. 9 is a flowchart diagram illustrating a golf play recording card generating operating mode of the golf game information system of the present invention.

FIG. 9 depicts a golf play recording card customizing and generating mode 160. The system asks a golfer if he wants to customize the golf play recording cards, step 161. If the answer is yes, the system asks the golfer to select the customizing information, step 162 and how the golfer wants the information displayed on each card, step 163. Then, the system asks the golfer to verify his selections, step 164. If the selections need to be changed, the system returns to step 162. If the selections are correct, the system asks the user to select which course and holes will be played, step 165. Then, the golf play recording cards are printed according to the golfer's requests, step 166. The flow then returns to the system operating mode selection, step 112.

Figure 10:
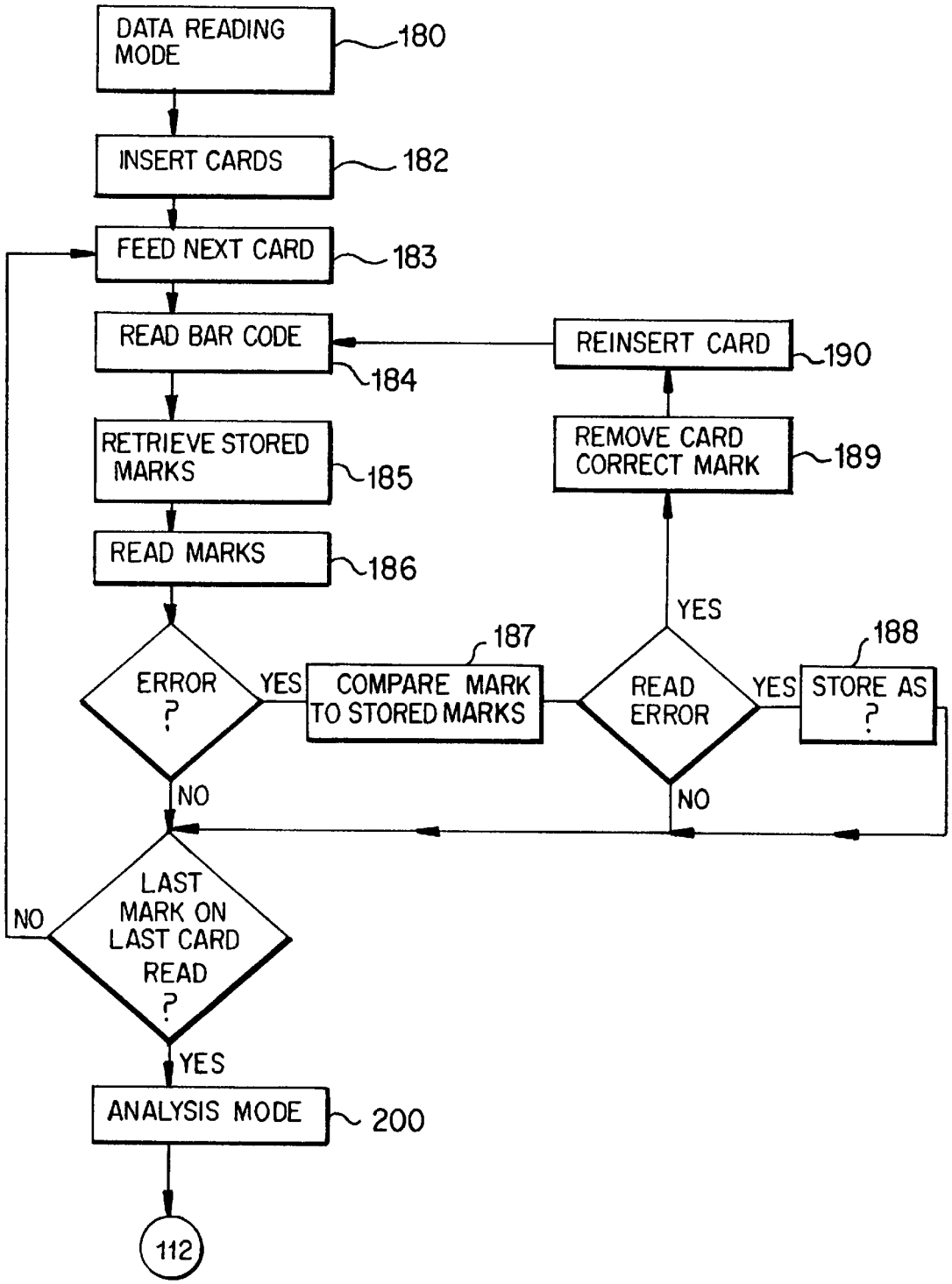
FIG. 10 is a flowchart diagram illustrating a data reading operating mode of the golf game information system of the present invention.

The data reading mode 180 is displayed in FIG. 10. When a user selects the data reading mode 180, the system will instruct the user to insert all of the cards to be read into a card hopper (not shown), step 182. Then, the system will automatically feed the cards one at a time to the reader 22, step 183. The bar code reader 24 first reads the bar code 78 to identify the golfer, step 184. The system then retrieves the stored characters 92 entered by the golfer when he first set up his system account, step 185. The system uses these stored characters 92 as a reference for the characters marked on each of the golf play recording cards 70. The reader 22 includes an error checking function which will detect any errors in reading information on the cards, step 186. If an error is detected, the system will compare the mark that is not able to be read with the previously stored characters 92 for that particular golfer, step 187. If the card reader 22 still cannot read the mark correctly, the system records a question mark where the unreadable mark is located, step 188. A golfer can correct the question mark later. For example, the next time a golfer enters the system, the system can display an error message on a display of the particular hole having the non-readable mark. The golfer can then enter the correct mark on the display if it is a touchscreen device or via a data entry device such as a voice print or keyboard. Alternatively, if a mark cannot be read, the system will feed the card out of the system and prompt the user to correct the marks made on the card, step 189. Then the card causing the reading error will be reinserted into the hopper, step 190 and read by the reader as is normal. If there are no errors in reading the cards, after the last card is read, the system automatically enters the analysis mode described in FIG. 9. The flow then returns to the system operating mode selection, step 112.

Figure 11:
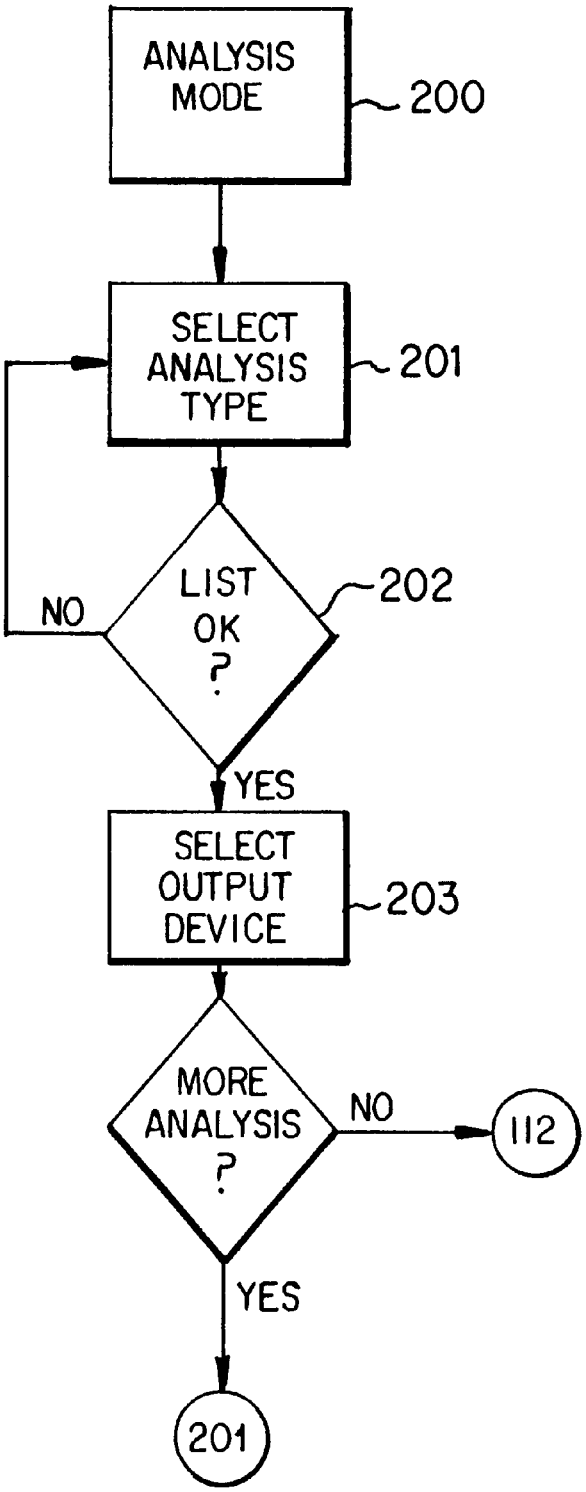
FIG. 11 is a flowchart diagram illustrating a golf play analysis operating mode of the golf game information system of the present invention.

FIG. 11 displays the steps of the analysis mode 200. First, the system prompts the user to select the type of analysis to be conducted, step 201. This analysis can include but is not limited to handicap computation, statistical compilation of the round including strokes per hole, strokes per club, distance per club, number of putts, fairways and greens hit in regulation, penalties, saves, eagles, birdies, pars, and bogeys. The golfer can also select a suggested club selection list to be generated by the system. This list displays the actual club used by a golfer and the recommendation of the system based on that golfer's golf play information. The club selection information can also be displayed graphically on a layout of each of the holes of the course using a display similar to that shown in FIG. 4. Further, a golfer can select a lesson generating analysis where the system recognizes consistent errors made by the golfer and outputs a lesson for correcting these errors. This lesson can be printed by the printer 18 so that the golfer has a permanent record of the lesson.

Once the list of desired analyses is complete, the system will prompt the user to verify these selections, step 202. If the selections are incorrect, the system will allow the user to correct the list by adding or deleting a type of analysis by returning to step 201. Once the list is correct, the system prompts the user to select whether the statistical analysis and results are to be output to the display 16 or printed by the printer 18, step 203. Then, the analysis is conducted and output to the desired location. The system in step 205 asks if the golfer desires more analysis or to return to the selection operation mode, step 112.

As mentioned previously, a golfer can avoid this selection process by storing preselected options to be used each time golf play cards are inserted to the system. The stored preselected options could also include an output device selection (usually a storage area of memory 12) for outputting the results of the analysis.

The analysis of the player's golf game can be accomplished by programs readily designed by one skilled in the art to evaluate the data stored in memory 12. The particular details of the analysis would be readily apparent to one skilled in the art given the desired objective to be obtained from the data. For example, if one skilled in the art knew that the objective was to analyze the data to detect if a particular golfer consistently slices his shot from the tee (i.e., the golf ball curves to the right from the tee), one skilled in the art could develop a program for analyzing tee shots and the location of the golf ball after a shot from the tee to detect a golfer's slice habit.

While this invention has been described in conjunction with specific embodiments thereof, it is evident that many alternatives, modifications and variations will be apparent to those skilled in the art. For example, a hand held data recording device can be used in place of the golf play recording cards. A hand held recording device can include a display depicting a layout of the course similar to that shown in FIG. 4. A golf ball location device in the form of a track ball, cursor and keyboard arrangement, or light pen device can be used to mark the golf ball location corresponding to the actual location on the golf course. This hand held device can also include a variety of character input devices for selecting and inputting a single character to mark both a golf ball location and a club used for each stroke. This information recorded on the hand held device can be temporarily saved on a memory card in the hand held device or can be transmitted via satellite to a satellite signal receiver cooperating with the system. If a memory card is used, this card can be removed from the hand held device and inserted into a card reader contained in the system.

Another possible modification is to use a hand held satellite signal transmitting device for transmitting a signal to a global positioning satellite to indicate an exact location of a golf ball on each hole of a golf course after each stroke. The hand held device would also include a golfer identifying device and a golf club identifying device so that a golfer and golf club are identified for each golf ball position signal transmitted. A satellite signal receiver can be provided for use with the system to receive the signals transmitted by the hand held transmitting device including a golfer identification, a golf club identification and a golf ball position indication. Thus, a golfer could easily record the exact location of a golf ball after each time a golf ball is hit. Further, the satellite signal transmitter could also comprise a switch for changing from a satellite signal transmitting device to a cellular telephone Accordingly, the preferred embodiments of the invention set forth in this description are intended to be illustrative, not limiting. Various changes may be made without departing from the spirit and scope of the invention as defined in the following claims.

What is claimed is:

1. An interactive golf information and analysis system comprising:

a programmable computer having a memory for storing golf course data;

a machine readable card generated by the programmable computer and illustrating a layout of at least one of a plurality of holes of a golf course wherein a golfer records a plurality of marks on the layout illustrated on the machine readable card, each of said plurality of marks on the layout representing a golf ball location and one of a plurality of golf clubs, wherein one of said plurality of marks is recorded for each of a plurality of golf strokes required to hit a golf ball from a tee to a cup on each of said plurality of holes;

an information reader connected to the programmable computer for reading information on the machine readable card including said plurality of marks recorded on the layout of said card and inputting the information into the memory of the programmable computer;

a data processor controlled by the programmable computer and operating on the information read by said information reader for determining a number of strokes required to hit the golf ball from the tee and into the cup and compiling statistical data indicating one of said plurality of golf clubs used for one of said plurality of strokes, a location of a golf ball after each of said plurality of strokes and a distance the golf ball is moved by each stroke.

2. The interactive golf information system of claim 1 further comprising updating means connected to the programmable computer for updating the machine readable card to reflect at least one of current course conditions, rules of play, instructions on how to best play each of said plurality of holes, distances from one of a plurality of tees to a pin on each of said plurality of holes and weather conditions.

3. The interactive golf information system of claim 1 further comprising customizing means connected to the programmable computer for allowing a golfer to select additional information to be displayed on the machine readable card.

4. The interactive golf information system of claim 3 wherein said additional information comprises distinguishing marks illustrating a previously played round of golf stored in said memory, wherein each of said distinguishing marks illustrate a location of a golf ball after each stroke and the golf club used for each stroke.

5. The interactive golf information system of claim 1 further comprising a printer connected to the programmable computer for printing said machine readable card for each of said plurality of holes.

6. The interactive golf information system of claim 5 wherein said printer comprises one of a multicolor printer and a color laser copier.

7. The golf information and analysis system of claim 1, wherein said data processor further comprises:

an error detection means for recognizing at least one of a plurality of golfer playing errors based on said statistical data and selecting a corrective lesson from a plurality of predetermined corrective lessons stored in said memory based on said at least one of said playing errors.

8. The golf information and analysis system of claim 1 wherein said machine readable [scorecard] *card* has a bar code located thereon for identifying one of said plurality of holes on said golf course and a golfer, and said information reader comprises a bar code reading means for reading said bar code on said machine readable scorecard.

9. The golf information and analysis system of claim 1 wherein each of said plurality of marks comprises an alphanumeric character and said information reader comprises a scanning means for scanning an image from said machine readable card, a digitizing means for digitizing a scanned image, and a character reading means for reading said alphanumeric character from a digitized image.

10. The golf information and analysis system of claim 9 wherein said character reading means comprises an optical character recognition device.

11. The [gold] *golf* information and analysis system of claim 1 further comprising an identification reader connected to the programmable computer for reading a golfer identification device which identifies a golfer and allows a golfer to access the system.

12. The golf information and analysis system of claim 11, wherein said identification reader comprises at least one of an access code recognition device, a voice print identification device and a magnetic card reader for use with at least one of a golfer identification card, credit card, debit card and automatic teller machine card having magnetic information written thereon.

13. The golf information and analysis system of claim 1 wherein said data processor further comprises a recommended club selection means for recommending one of said plurality of golf clubs for each of said plurality of strokes based on said statistical data.

14. The golf information and analysis system of claim 1 further comprising a touch-sensitive video display screen connected to the programmable computer and including a display and a user interface for allowing a user to create a flow of data to and from said data processor.

15. The golf information and analysis system of claim 1 wherein said programmable computer further comprises an operating control means operating in a plurality of golf information system operating modes including a machine readable card generating mode, a tee-time reservation mode, a payment transaction mode, a lesson generating mode, a golf play analyzing mode, an information update mode, and a printing mode.

16. A method of compiling and analyzing golf play information based on a golfer's performance on at least one hole of at least one golf course, said method comprising the steps of:

storing golf course data in a memory of a programmable computer;

generating from the memory a machine readable card for each of a plurality of holes on a golf course wherein said machine readable card illustrates a layout of at least one of a plurality of holes of a golf course for recording a plurality of marks thereon;

recording a mark on the layout illustrated on said machine readable card each time a golf ball is hit, said mark representing a golf ball location and one of a plurality of golf clubs used to hit the golf ball;

reading and storing each mark on the layout illustrated on said machine readable card using an information reader;

using the programmable computer to determine a number of strokes required to hit the golf ball from the tee and into the cup; and compiling statistical data from the marks on the layout illustrated on the machine readable card based on each mark read by the information reader, said statistical data indicating one of said plurality of golf clubs used for each of said plurality of strokes, a location of a golf ball after each of said plurality of strokes and a distance the golf ball is moved by each stroke.

17. The method of claim 16 further comprising the steps of:

analyzing said statistical data to determine consistent errors made by a golfer;

selecting at least one of a plurality of predetermined corrective lessons based on said consistent errors; and generating recommendations for improved performance based on a selected predetermined corrective lesson.

18. The method of claim 16 further comprising the step of:

updating the memory so that said machine readable card reflects at least one of current course conditions, rules of play, instructions on how to best play each of said plurality of holes, distances from one of a plurality of tees to a pin on each of said plurality of holes and weather conditions.

19. The method of claim 16 further comprising the step of:

customizing said machine readable card to include additional information selected by a golfer on said card, said additional information including a plurality of distinguishing marks illustrating a previously played round of golf, each of said distinguishing marks illustrating a location of a golf ball after each stroke and the golf club used for each stroke.

20. An interactive golf information and analysis system comprising:

a programmable computer having a memory for storing golf course data;

a machine readable card generated by the programmable computer and illustrating a layout of at least one of a plurality of holes of a golf course wherein a golfer records a plurality of marks on the layout illustrated on the machine readable card; each of said plurality of marks on the layout representing a golf ball location, one of a plurality of golf clubs and a stroke sequence; wherein one of said plurality of marks is recorded for each of a plurality of golf strokes required to hit a golf ball from a tee to a cup on each of said plurality of holes;

an information reader connected to the programmable computer for reading information on the machine readable card including said plurality of marks recorded on the layout of said card and inputting the information into the memory of the programmable computer;

a data processor controlled by the programmable computer and operating on the information read by said information reader for determining a number of strokes required to hit the golf ball from the tee and into the cup and compiling statistical data indicating one of said plurality of golf clubs used for one of said plurality of strokes, a location of a golf ball after each of said plurality of strokes and a distance the golf ball is moved by each stroke.

21. A method of compiling and analyzing golf play information based on a golfer's performance on at least one hole of at least one golf course, said method comprising the steps of:

storing golf course data in a memory of a programmable computer;

generating from the memory a machine readable card for each of a plurality of holes on a golf course wherein said machine readable card illustrates a layout of at least one of a plurality of holes of a golf course for recording a plurality of marks thereon;

recording a mark on the layout illustrated on said machine readable card for each golf stroke; said mark representing a golf ball location, one of a plurality of golf clubs used to hit the golf ball, and a stroke sequence;

reading and storing each mark on the layout illustrated on said machine readable card using an information reader;

using the programmable computer to determine a number of strokes required to hit the golf ball from the tee and into the cup; and compiling statistical data from the marks on the layout illustrated on the machine readable card based on each mark read by the information reader, said statistical data indicating one of said plurality of golf clubs used for each of said strokes, a location of a golf ball after each of said plurality of strokes and a distance the golf ball is moved by each stroke.

*22. An interactive golf information apparatus comprising:*

*a programmable computer having a memory for storing golf course data;*

*an electronic display associated with the programmable computer and illustrating a layout of at least one of a plurality of holes of a golf course and types of information capable of being recorded on the layout, each type of information being recorded on the layout representing a golf ball location and one of a plurality of golf clubs, and being recorded for each of a plurality of golf strokes required to hit a golf ball from a tee to a cup on each of said plurality of holes;*

*an information reader connected to the programmable computer for reading the information on the electronic display including the information recorded on the layout and inputting the information into the memory of the programmable computer; and*

*a data processor controlled by the programmable computer and operating on the information read by said information reader for determining a number of strokes required to hit the golf ball from the tee and into the cup, wherein the data processor compiles statistical data indicating one of said plurality of golf clubs used for one of said plurality of strokes, a location of a golf ball after each of said plurality of strokes and a distance the golf ball is moved by each stroke.*

*23. A method of compiling and analyzing golf play information based on a golfer's performance on at least one hole of at least one golf course, said method comprising the steps of:*

*storing golf course data in a memory of a programmable computer;*

*generating from the memory an electronic display of each of a plurality of holes on a golf course wherein said electronic display illustrates a layout of at least one of a plurality of holes of a golf course for recording types of information thereon;*

*recording one type of information on the layout illustrated on said electronic display each time a golf ball is hit, said type of information representing a golf ball location and one of a plurality of golf clubs used to hit the golf ball;*

*reading and storing each type of information on the layout illustrated on said electronic display using an information reader;*

*using the programmable computer to determine a number of strokes required to hit the golf ball from the tee and into the cup; and*

*compiling statistical data from the types of information on the layout illustrated on the electronic display based on each type of information read by the information reader, said statistical data indicating one of said plurality of golf clubs used for each of said plurality of strokes, a location of a golf ball after each of said plurality of strokes and a distance the golf ball is moved by each stroke.*

* * * * *